Patented May 9, 1950

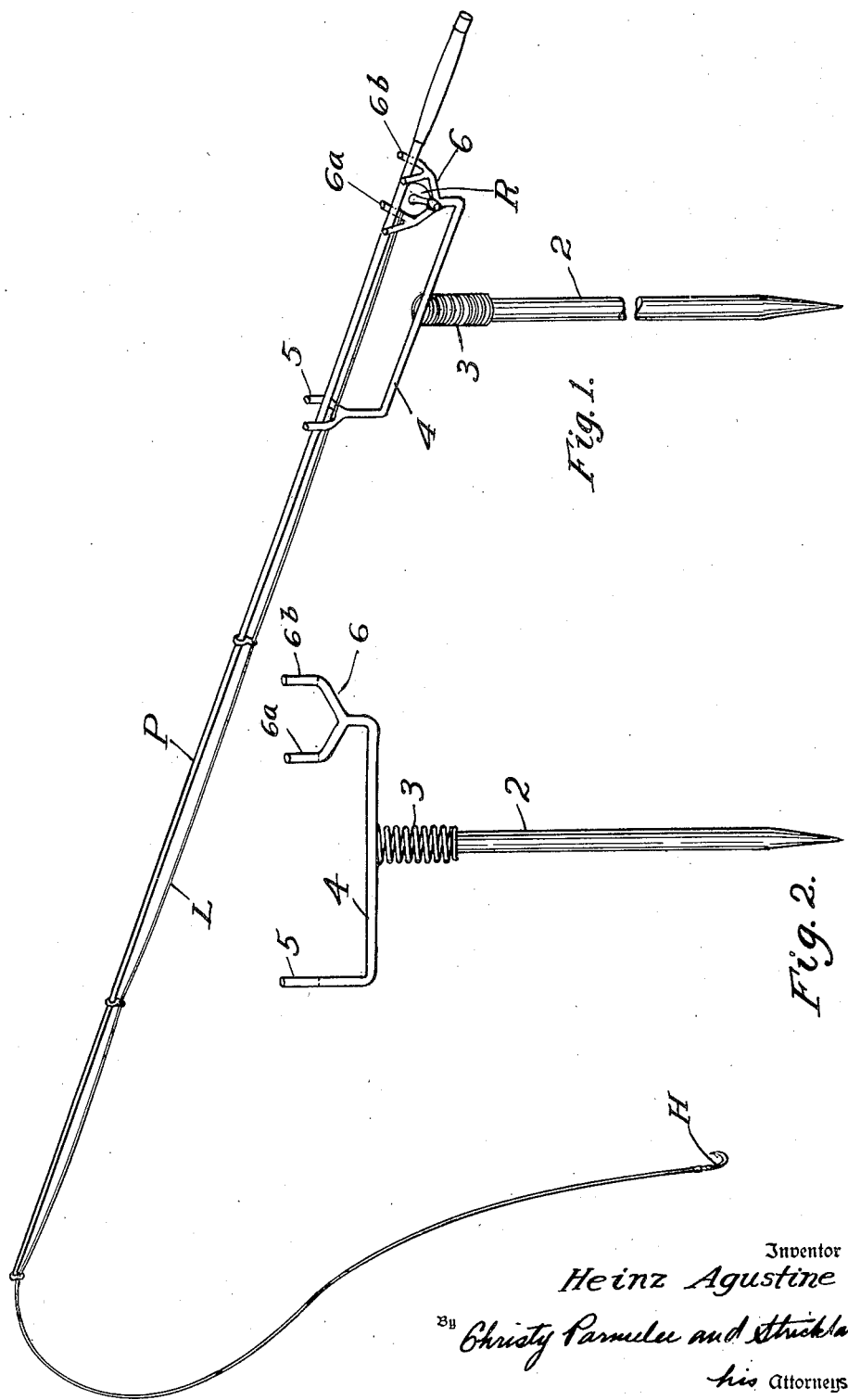

2,506,912

UNITED STATES PATENT OFFICE 2,506,912

FISHING ROD HOLDER

Heinz Augustine, Mars, Pa., assignor of one-sixth to B. M. Dangerfield, one-sixth to Joseph Kremer, Jr., one-sixth to N. L. McDonald, one-sixth to R. E. Spatig, and one-sixth to W. J. Vecharella, all of Mars, Pa.

Application April 14, 1948, Serial No. 20,933

2 Claims. (Cl. 248—42)

My invention relates to fishing, and consists in an improved holder for a fishing rod and line.

The object of the invention is to provide a holder that may be readily secured in the ground at the edge of a body of water to be fished, and, as thus secured, adapted to sustain a rod and line in fishing position, with the effect that a fish taking the bait will be "played," after the manner that a fisherman plays the rod and line when a fish is hooked.

The invention will be understood upon reference to the accompanying drawings, in which:

Figure 1 is a view in perspective of a holder embodying the invention and showing a fishing rod in mounted position; and Figure 2 is a view in side elevation of the holder without the fishing rod.

A holder of the invention comprises essentially three elements: a support, means for securing a rod and line in fishing position, and a substantially universally yieldable device resiliently connecting the support and the rod-securing means, whereby the end of the rod from which the line extends into the water may yield vertically and laterally in either direction, but with an increasing resistance to the movement the further away from normal position the rod is swung.

The support element of the holder preferably comprises a stake 2 of metal which may readily be forced into the ground to the depth required to provide adequate rigidity and securing of the stake. The rod-securing element takes the form of a metal bar extending as an arm 4 transversely of the supporting stake 2. And the universal elastic joint uniting the parts 2 and 3 advantageously consists of a helical spring 3. The lower coil of the spring is fixed, as by welding, to the top of the stake, while the upper coil or convolution of the spring is likewise secured medially to the arm 4. Upstanding crotches 5 and 6 are provided at the two ends of the arm 4, and in these crotches a fishing rod P is supported in proper fishing position, with the line L extended from reel R to the end of the rod, and thence to the hook H suspended at the end of the line.

The union provided by the coil spring 3 is important. It affords simplicity and economy of construction, while providing in fullest measure the desired characteristics of line and rod movements when a fish takes the bait on hook H.

It is also important to note that the crotch 6 is a doubly crotched or forked device, including a crotch portion 6a and a crotch portion 6b, spaced apart and aligned with the crotch 5 at the opposite end of the arm 4. The two crotch portions 6a and 6b are interconnected to form between them still another crotch, or cradle, which receives the reel R on the rod, as shown in Figure 1, with the body of the rod P extended in opposite directions therefrom. It is manifest that the rod may be easily and quickly taken from the holder and replaced when and as desired, and when positioned in the holder, the rod is securely held against all tension and flexing encountered when a fish takes the bait and starts to "run."

The spring connector 3 provides what may be termed a resilient universal joint, whereby, even though the stake 2 be rigidly secured in the ground, the rod P (and with it the arm 4) may be tilted from end to end as its distal end is pulled downward and bowed under the downward pull of a fish on the hook H, or may be swung to either side under the effect of a corresponding lateral pull of the fish, and it will be understood that the spring 3 operates to resist such movements of the rod in greater and greater degree as the movements continue in any direction a greater and greater distance. This provides a very effective reaction to the pull of a fish on the hook. It is akin to the manipulation of a skilled fisherman. When the fish is nibbling at the bait and the line approaches a taut condition the rod P and its holder arm 4 yield to the slightest stress. When, however, the fish is engaged by the hook, and struggles to become free, the rod P and its supporting arm 4, under the continued pull on the line, operate through the spring 3 to increase progressively the magnitude of the yielding resistance to the pull. The conditions are ideal for facilitating the initial hooking of a fish, and, once hooked, to prevent the loss of the catch.

The winding stem of the reel R is positioned freely between and to one side of the cradle formed by the two crotch portions 6a and 6b, and, if desired, the reel may be unlocked to allow a predetermined paying out of the line when a hooked fish runs with the bait. This may be desirable in the case of certain game fish, and in conjunction with universal resilient movements of the supported rod minimizes the loss of catches.

Within the terms of the appended claims, many variations or modifications in structural detail are permissible without departure from the essence of the invention.

I claim:

1. A fishing rod holder comprising a vertically extending support, a coil spring having one end secured to the upper end of said support with its axis constituting an extension of the support, an elongated member extending transversely of the said spring axis and having a central connection to the otherwise free end of said spring, said member having spaced ends on opposite sides of said central connection, one of said ends having a single fork projecting outwardly therefrom, and the other of said ends having a double fork projecting outwardly therefrom, all of said forks occupying positions in alignment with each other to provide crotches in which a fishing rod may be placed and be supported at three spaced points along its length, the forks of said double fork being spaced apart a distance such that their respective crotches will engage with a fishing rod on opposite sides of a reel carried thereby so that the reel will be effective to limit endwise movement of a fishing rod through said crotches while supported on said forks.

2. A fishing rod holder comprising an elongated member having spaced ends, one of said ends having a supporting structure projecting outwardly therefrom for supporting engagement with a fishing rod, the other of said ends having a double fork projecting outwardly therefrom, the forks of said double fork having crotches in which a fishing rod may be placed and supported at two additional points both spaced from the point of engagement of the rod with said supporting structure, said forks being spaced apart a distance such that their respective crotches will engage with a fishing rod on opposite sides of a reel carried thereby so that the reel will be effective to limit endwise movement of a fishing rod through said crotches while supported on said forks.

HEINZ AUGUSTINE.

REFERENCES CITED

The following references are of record in the file of this patent:

UNITED STATES PATENTS

| Number | Name | Date |
|---|---|---|
| 521,355 | Yapp | June 12, 1894 |
| 2,309,350 | Nanasko | Jan. 26, 1943 |
| 2,311,823 | Gaskill | Feb. 23, 1943 |
| 2,426,881 | Johnson et al. | Sept. 2, 1947 |